(12) United States Patent
Stefanidis et al.

(10) Patent No.: US 10,764,611 B2
(45) Date of Patent: Sep. 1, 2020

(54) PROGRAM VERIFICATION AND DECISION SYSTEM

(71) Applicant: Disney Enterprises, Inc., Burbank, CA (US)

(72) Inventors: Efthimis Stefanidis, Douglaston, NY (US); Vladislav Feldman, Manhasset Hills, NY (US); Michael J. Strein, Bohemia, NY (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/251,322

(22) Filed: Aug. 30, 2016

(65) Prior Publication Data
US 2018/0063558 A1    Mar. 1, 2018

(51) Int. Cl.
| | |
|---|---|
| *H04N 21/234* | (2011.01) |
| *H04N 21/232* | (2011.01) |
| *H04N 21/8358* | (2011.01) |
| *H04N 21/262* | (2011.01) |
| *H04N 21/81* | (2011.01) |
| *H04N 21/2389* | (2011.01) |
| *H04N 21/44* | (2011.01) |
| *H04N 19/467* | (2014.01) |
| *H04N 1/32* | (2006.01) |

(52) U.S. Cl.
CPC ..... *H04N 21/23418* (2013.01); *H04N 1/3232* (2013.01); *H04N 1/32331* (2013.01); *H04N 19/467* (2014.11); *H04N 21/232* (2013.01); *H04N 21/23892* (2013.01); *H04N 21/26208* (2013.01); *H04N 21/26258* (2013.01); *H04N 21/44008* (2013.01); *H04N 21/812* (2013.01); *H04N 21/8358* (2013.01)

(58) Field of Classification Search
CPC ....... H04N 21/23418; H04N 21/23892; H04N 21/26258; H04N 21/44008; H04N 21/83; H04N 21/8358
See application file for complete search history.

(56) References Cited

U.S. PATENT DOCUMENTS

| | | | |
|---|---|---|---|
| 2006/0179469 A1* | 8/2006 | Fransman | H04N 21/2385 725/115 |
| 2008/0002854 A1* | 1/2008 | Tehranchi | G06F 21/10 382/100 |

(Continued)

*Primary Examiner* — Jeremy S Duffield
(74) *Attorney, Agent, or Firm* — Patterson + Sheridan, LLP

(57) ABSTRACT

Embodiments herein describe a content distribution system that verifies a media presentation (or portions thereof) using a broadcast schedule. In one embodiment, the content verification system evaluates the media presentation to identify a unique identification data for the presentation such as a fingerprint or watermark. Using the broadcast schedule, the content verification system can identify what content the media presentation should (or is expected) to contain. The content verification system can retrieve a previously stored unique identifier from a database corresponding to the content identified using the broadcast schedule. If the stored unique identifier matches the unique identifier derived by the content verification system, the system verifies the content in the media presentation is correct. The verified media presentation can then be transmitted to a content distribution network—e.g., a broadcast network or video-on-demand provider.

20 Claims, 6 Drawing Sheets

(56) References Cited

U.S. PATENT DOCUMENTS

| | | | |
|---|---|---|---|
| 2008/0249961 A1* | 10/2008 | Harkness | H04N 21/23892 705/400 |
| 2012/0089999 A1* | 4/2012 | Wilcox | H04N 21/266 725/31 |
| 2012/0110043 A1* | 5/2012 | Cavet | G06F 16/70 707/825 |
| 2014/0324201 A1* | 10/2014 | Coburn, IV | H04N 21/43615 700/94 |
| 2015/0181269 A1* | 6/2015 | McMillan | H04N 21/2668 725/19 |
| 2015/0271234 A1* | 9/2015 | O'Malley | H04N 21/472 709/219 |
| 2016/0180362 A1* | 6/2016 | Brown | G06Q 30/0204 705/7.33 |
| 2017/0085936 A1* | 3/2017 | Sheffler | H04N 21/26258 |

\* cited by examiner

CHART 300

| TIMESTAMP | SCHEDULE 145 | |
|---|---|---|
| | CONTENT | ASSET ID |
| 12:00 | SEGMENT 1 SHOW A | SHOW001_1 |
| 12:12 | COMMERCIAL A | COM011 |
| 12:13 | PROMO A | PROMO215 |
| 12:14 | COMMERCIAL B | COM302 |
| 12:15 | SEGMENT 2 SHOW A | SHOW001_2 |
| ... | | |

CHART 350

| FINGERPRINT DATABASE 120 | |
|---|---|
| ASSET ID | FINGERPRINT |
| SHOW001_1 | 452108 |
| COM011 | 639102 |
| TRUM0215 | 149550 |
| COM302 | 287201 |
| SHOW001_2 | 369336 |
| ... | |

FIG. 3

PROGRAM VERIFICATION AND DECISION SYSTEM

BACKGROUND

Field of the Invention

The embodiments herein are generally directed to verifying a media presentation using a broadcast schedule.

Description of the Related Art

Broadcast schedules (which can also be referred to as playlists) list the sequence of shows for a broadcast or cable channel. These schedules are typically based on a section of the day and contain program, commercial, promotional, and graphical content. For example, the schedules may match specific content to timestamps indicating when the content should be broadcasted.

Some content distributors (e.g., TV stations) use verification applications to determine if there are errors in their transmissions. For example, the verification applications may determine if the transmission has test signals (e.g., color bars) or a long periods of black indicating no content is being transmitted. However, a human operator or an automation process may insert the wrong content into a media presentation (or switch the ordering of the content) such that the media presentation does not match the broadcast schedule. Current verification techniques cannot detect these errors but rather are limited to identifying situations where no content is being transmitted.

SUMMARY

One embodiment described herein is a method for verifying a media presentation. The method includes identifying first identification data by evaluating received media presentation data and identifying content expected in the media presentation according a schedule where the schedule indicates a presentation order of the content for the media presentation. The method includes receiving second identification data where the second identification data is based on data in the expected content and where the second identification data was generated before identifying the first identification data. The method includes comparing the first identification data to the second identification data in order to verify whether the media presentation data corresponds to the content expected in the media presentation.

Another embodiment described herein is a non-transitory computer readable storage medium that includes computer-readable program code for verifying a media presentation, wherein, when executed by a computing processor. The computer-readable program code performs an operation including identifying first identification data by evaluating received media presentation data and identifying content expected in the media presentation according to a schedule where the schedule indicates a presentation order of the content for the media presentation. The operation includes receiving second identification data where the second identification data is based on data in the content and where the second identification data was generated before identifying the first identification data. The operation includes comparing the first identification data to the second identification data in order to verify whether the media presentation data corresponds to the content expected in the media presentation.

Another embodiment described herein is a system including one or more computing processors and a memory comprising a program that when executed by the one or more computer processor performs an operation for verifying a media presentation. The operation includes identifying first identification data by evaluating media presentation data and identifying content expected in the media presentation according a schedule where the schedule indicates a presentation order of the content for the media presentation. The operation includes receiving second identification data where the second identification data is based on data in the expected content and where the second identification data was generated before identifying the first identification data. The operation includes comparing the first identification data to the second identification data in order to verify whether the media presentation data corresponds to the content expected in the media presentation.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 3 illustrates a broadcast schedule and a fingerprint database, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments herein describe a content distribution system that verifies a media presentation (or portions thereof) using a broadcast schedule. Unlike verification techniques that detect only whether a broadcast includes test signals or a long period of black, a content verification system determines if the content for a media presentation (e.g., media presentation data) matches the list of content described in a broadcast schedule. In one embodiment, the content verification system evaluates the media presentation data to identify a unique identifier for the presentation such as a fingerprint or watermark. Using the broadcast schedule, the content verification system can identify what content the media presentation should (or is expected) to contain. The content verification system can retrieve a previously stored unique identifier from a database corresponding to the content identified using the broadcast schedule. If the stored unique identifier matches the unique identifier derived by the content verification system, the system verifies the content for the media presentation is correct. The verified media presentation can then be transmitted to a content distributor—e.g., a broadcast network, video-on-demand provider, or internet streaming service.

In one embodiment, the content verification system is a distributed system that can verify the media presentation at different stages of compilation. For example, the content verification system may include multiple content verification clients that verify the media presentation at each stage of compilation such as after the program content is assembled, after commercials are added, after the presentation has been transmitted to a remote destination, and the like. Thus, the media presentation (e.g., a television show, live sporting event, live concert, news show and the like) can be verified multiple times using the broadcast schedule to ensure the presentation is correct.

Figure 1:
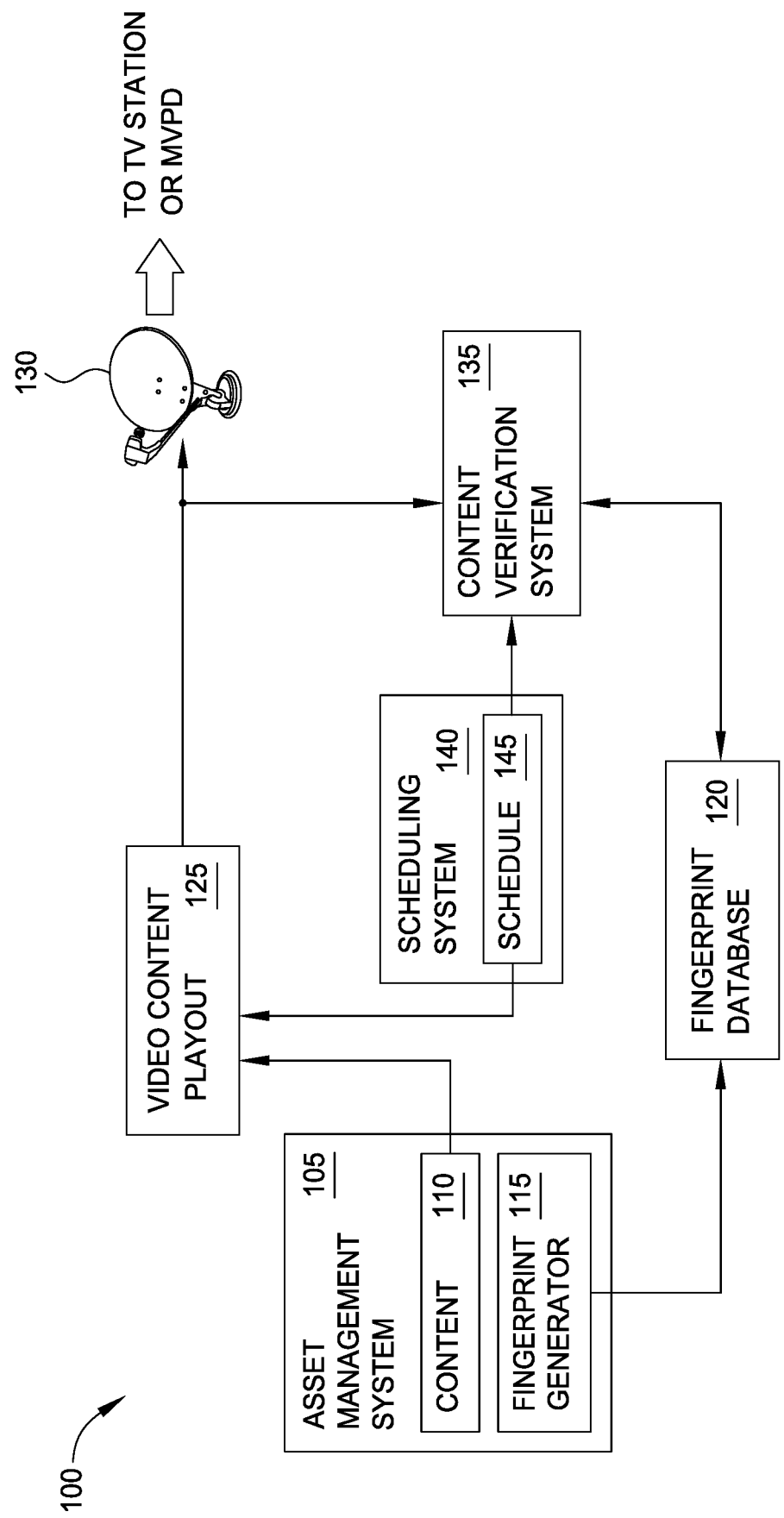
FIG. 1 illustrates a system for verifying content using a broadcast schedule, according to one embodiment described herein.

FIG. 1 illustrates a content distribution system 100 for verifying content using a broadcast schedule 145, according to one embodiment described herein. Although not shown, the various components in the content distribution system 100 may be software, hardware, firmware, or combinations thereof. Moreover, the system 100 may include any number of computing systems which include processors and memory for performing the functions described herein.

The content distribution system 100 includes an asset management system 105, a fingerprint database 120, a video content playout 125, a content verification system 135, and a scheduling system 140. The asset management system 105 includes content 110 and a fingerprint generator 115. The content 110 can include program segments, snipes (or other screen overlays), commercials, promotions, advertisements, other interstitial material, etc. The content 110 can be received from various different providers such as advertisers, third-party production studios, in-house production studios, graphic designers, marketing companies, and the like.

The fingerprint generator 115 processes the received content 110 to generate unique identification data (e.g., a fingerprint or watermark) for the content 110. In one embodiment, the generator 115 processes the audio or video data (or both) in the content 110 using an algorithm to generate a fingerprint that can be used to identify the content 110—e.g., a program segment, commercial, promotion, etc.—from other content 110 stored in the asset management system 105. As used herein, a fingerprint, when pertaining to media identification, is a representation of the media that can be stored and referenced. The fingerprint can be created from the audio, the video or from a mixture of both of those aspects of the media asset. In one embodiment, the fingerprint is the result of a unique calculation of the audio/video that can be accurately repeated and stored, and can then be referenced to identify the media asset or content.

In one embodiment, the fingerprint generator 115 does not need to process all of the data in the content 110 to generate the fingerprint. For example, the generator 115 may process only the first 2-5 seconds of the content 110 or the first 100 to 400 frames in the content 110 to generate the fingerprint. Thus, even though the content 110 (e.g., a program segment) can be 10-20 minutes long, the fingerprint generator 115 can generate the fingerprint for the program segment using the first few seconds of the segment. In the case where the content is exceptionally long, such as 10-20 minutes as in the example above, the fingerprints may be continuously or occasionally re-generated to provide additional verification. The fingerprint database 120 would then be updated accordingly.

Once generated, the fingerprint generator 115 transmits the fingerprint to the fingerprint database 120 for storage. In one embodiment, the media content may be received multiple times by the asset management system 105 (e.g., the same commercial or the same promo). In such a case, the fingerprint database 120 may not include new entries for the repeated content, and instead, the system 105 can recognize the content has already been processed and a new entry in the fingerprint database 120 is not needed.

Although the embodiments herein are described using the specific example of a fingerprint as the unique identification data, the embodiments herein can also be used if a watermark is generated and then embedded in the content 110. In that example, the system 100 would include a watermark database for storing watermarks added to the content 110. As described in more detail below, the watermarks and/or fingerprints can be retrieved by the content verification system 135 to verify that the correct content is being broadcasted. In this manner, the assert management system 105 can process all the incoming content 110 and generate unique identification data for that content 110. Of course, in other embodiments, the identification data (e.g., watermarks or fingerprints) may be provided to the asset management system 105 by a third party.

The video content playout 125 retrieves the content 110 from the asset management system 105 and generates a media presentation according to a schedule 145 in the scheduling system 140. Generally, the schedule 145 indicates the specific content that should be broadcast at the various timeslots throughout the day. The video content playout 125 arranges the content 110 according to the schedule 145. Although the schedule 145 may be static, in one embodiment, the scheduling system 140 can dynamically change the schedule 145 in response to live events—e.g., special broadcasts or new reports. In response to the live event, the scheduling system 140 may transmit an updated schedule 145 to the video content playout 125 which alters the media presentation accordingly.

In one embodiment, the video content playout 125 may use an automation application to generate the media presentation using the schedule 145. For example, the automation application may retrieve the content 110 from the asset management system 105 and arrange the content 110 according to timestamps in the schedule 145. In one embodiment, the video content playout 125 may rely on user input in order to output the media presentation. For example, a technician may need to send the correct data to the video content playout 125 or select the appropriate feed according to the schedule 145. If either the automation application or the technician makes a mistake, the resulting media presentation may differ from the schedule 145. Stated differently, the media presentation generated by the video content playout 125 does not follow the schedule 145.

The content verification system 135 monitors the media presentation outputted by the video content playout 125 to ensure the presentation follows the schedule 145. To do so, the content verification system 135 receives the media presentation from the video content playout 125 and the schedule 145 from the scheduling system 140. Using the schedule 145, the content verification system 135 determines the content that should be (i.e., is expected to be) in the media presentation. The content verification system 135 can then transmit a request to the fingerprint database 120 to provide the fingerprints of the content identified by the schedule 145.

Using the same algorithm performed by the fingerprint generator 115, the content verification system 135 generates a fingerprint for the content in the media presentation generated by the video content playout 125. If the fingerprints retrieved from the fingerprint database 120 match the fingerprints generated from the media presentation, the content verification system 135 validates the media presentation. In one embodiment, the content verification system 135 permits the media presentation to be transmitted by the communication system 130 to a distributor such as a TV station or multichannel video programming distributor (MVPD). For example, the communications system 130 may wait until the content verification system 135 has verified the media presentation before transmitting the presentation to a distributor. As will be discussed later, if the fingerprints do not match, the content verification system 135 can perform one or more disaster recovery rules to ensure the media presentation is fixed before being sent to a content distributor.

Figure 2:
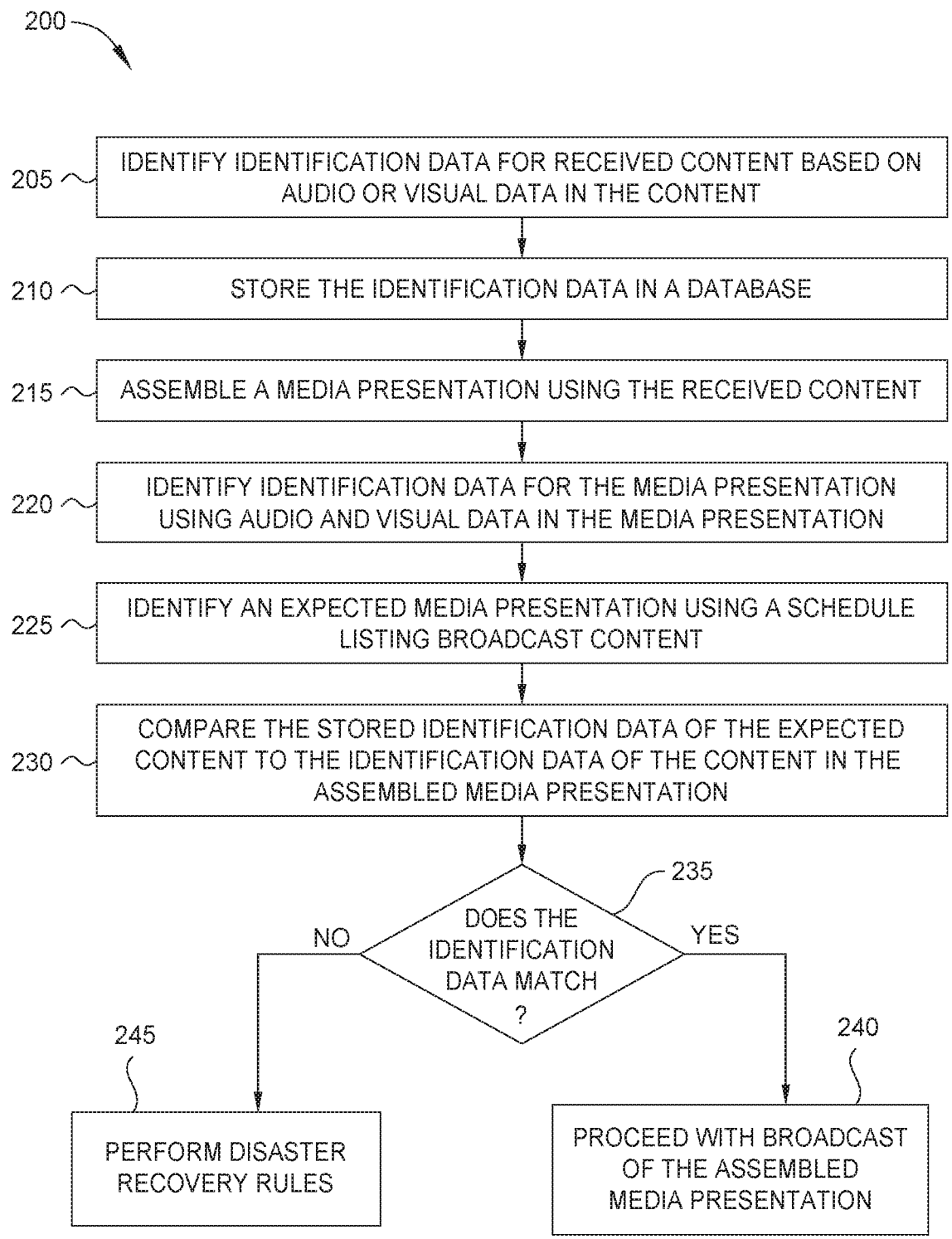
FIG. 2 is flowchart for verifying content using a broadcast schedule, according to one embodiment described herein.

FIG. 2 is flowchart of a method 200 for verifying content using a broadcast schedule, according to one embodiment described herein. At block 205, the asset management system generates identification data (e.g., a fingerprint or watermark) for received content based on media presentation data of the content (e.g., audio or visual data). In one embodiment, the asset management system includes a fingerprint generator which uses all or a part of the media presentation data (e.g., program segments, snipes (or other screen overlays), commercials, promotions, advertisements, other interstitial material, etc.) to generate the identification data. For example, the fingerprint generator may process the first few seconds of the audio and/or visual data of the content to output the identification data.

The asset management system can receive the content from any number of sources. For example, the program content may originate from a production or finishing studio, commercial content may come from a third-party (e.g., marketing agency), and snipes may come from graphical design studio. Although method 200 assumes the identification data for the received content has not already been generated, in one embodiment, the identification data may be provided when the content is sent to the asset management system.

At block 210, the asset management system stores the identification data in a database—e.g., a fingerprint or watermark database. In one embodiment, before the received content can be used to generate a media presentation, the content distribution system may identify and store a corresponding fingerprint (or fingerprints) for the content. In this manner, any of the content received by the content distribution system can identified using the fingerprints.

At block 215, the video content playout assembles a media presentation using the received content. In one embodiment, the video content playout outputs a media presentation to satisfy a predefined schedule which identifies the content and a corresponding timestamp when that content should be broadcasted. In one embodiment, the media presentation is sent to a TV station for live broadcast to a user. However, the media presentation may be sent to an on-demand distributor (e.g., MVPD or internet streaming service).

At block 220, the content verification system identifies identification data for the media presentation based on data in the media presentation (e.g., audio and/or visual data used to generate a fingerprint or a watermark embedded in the presentation). As illustrated in greater detail below, the content verification system can generate fingerprints corresponding to the content in the media presentation at different times during the compilation of the media presentation. For example, the content verification system may generate fingerprints for the media presentation after the program content is added as well as after the commercial content is added. Furthermore, the content verification system may generate fingerprints for the media presentation before and after the presentation is transmitted to a TV station or MVPD.

In one embodiment, when generating the identification data, the content verification system performs the same algorithm used to generate the identification data at block 205. Thus, when the content verification system generates fingerprints at block 220, those fingerprints can be matched to fingerprints stored at block 210. In this manner, the content verification system can use the fingerprints to identify the content in the media presentation. For example, the media presentation may include different types of content (e.g., program, commercial, or promotional content) or different instances of the same type of content (e.g., two program segments of the same show) which can be identified by generating fingerprints for the various content.

At block 225, the content verification system identifies expected content in the media presentation using a schedule listing the broadcast content. Put differently, the schedule indicates to the content verification system what content should be in the media presentation and the order of that content. As mentioned above, the schedule may be static (i.e., unchanging) or dynamic (i.e., updated periodically or in response of a live event). In one embodiment, the content verification system matches a timeslot (or timestamp) of the media presentation to a timeslot in the schedule in order to identify the expected content. For example, the media presentation may include metadata indicating the show or the timeslot of the show which the content verification system can use to identify the corresponding show or timeslot in the schedule and the expected content.

FIG. 3 illustrates a broadcast schedule 145 and a fingerprint database 120, according to one embodiment described herein. Chart 300 is one example of a broadcast schedule 145 which identifies the content that should be broadcasted during each timestamp. As shown, at 12:00, Segment 1 of Show A should be broadcasted by a content distributor, Commercial A should be broadcasted at the 12:12 timestamp, Commercial B should be broadcasted at the 12:13 timestamp, and so forth. The third column in the schedule 145 illustrates the Asset ID of the content at each timestamp. The Asset ID is an ID that the content distribution system uses to identify the content from the other content in the asset management system, and thus, the asset ID may be a unique ID. Like the fingerprints, the asset ID may be assigned to the content when the content is received by the asset management system.

Using schedule 145 illustrated in Chart 300, the content verification system can identify the content that should be (or is expected to be) in the media presentation. For example, if the media presentation spans the timeslot 12:00 to 12:30 (e.g., a thirty minute show), the media presentation should include all the content listed in chart 300 in the specified order. The content verification system can use the schedule 145 to identify what content should be broadcasted at each timestamp in the timeslot.

Although Chart 300 illustrates a schedule with timestamps in a timeslot, if the media presentation is transmitted only to an on-demand content distributor, the schedule may lack timestamps. However, the schedule still indicates an order that the content in the media presentation (e.g., the program, commercial, promotional, and/or graphical content) should be presented to the viewer. Thus, the term "schedule" can include a broadcast schedule indicating times the content should be broadcast as well as a schedule used to assemble content for distribution over on-demand content distributor where timestamps are not relevant.

Returning to method 200, at block 230, the content verification system compares the stored identification data of the content (e.g., media presentation data) for the media presentation to the identification data of the assembled media presentation. Put differently, the content verification system compares the fingerprint identified using the content in the media presentation at block 225 to the fingerprints stored in the fingerprint database. To do so, in one embodiment, the content verification system uses the asset IDs in the schedule 145 shown in chart 300 to identify the relevant content in the fingerprint database 120 shown in chart 350. That is, the content verification system determines what timestamps are spanned by the media presentation and uses the schedule 145 in chart 300 to identify the asset ID of the content at those timestamps. Using the asset IDs, the content verification system indexes into the fingerprint database 120 and retrieves the corresponding fingerprints. For example, the asset ID "SHOW001_1" corresponds to the fingerprint 452108.

The content verification system compares the fingerprints retrieved from the fingerprint database 120 to the fingerprints the content verification system generated from the content in the media presentation at block 225. At block 235, the content verification system determines if the fingerprints match. That is, the content verification system determines whether the content in the media presentation is the same content specified in the schedule 145 and that the content in the media presentation is arranged in the same order as specified in the schedule 145. For example, the content verification system may generate a list of fingerprints for all the content in the media presentation in the order in which the content appears in the presentation. The content verification system can then compare these fingerprints to the fingerprints of the content provided in the schedule 145 to ensure the fingerprints are the same and in the correct order.

If the fingerprints match, method 200 proceeds to block 240 where the content distribution system proceeds with transmitting the assembled media presentation to distributor—e.g., a TV station or MVPD. In turn, the distributor broadcasts the assembled media presentation to a user device during a live broadcast or on-demand.

However, if the fingerprints do not match, method 200 proceeds to block 245 where the content verification system performs disaster recovery rules. In one embodiment, the content verification system prevents the content distribution system from transmitting the media presentation to the distributors if the fingerprints do not match. The disaster recovery rules may indicate different policies for handing different types of errors in the media presentation. For example, if the media presentation is generated well before the presentation is schedule to be broadcast (e.g., the day before), the content verification system may issue an alert to a technician who can troubleshoot the problem and instruct the video content playout to re-assemble the media presentation data. In another embodiment, the disaster recovery rules may instruct the content verification system to replace the media presentation with a media presentation retrieved from a backup storage location or from a backup video content playout facility. For example, for a live event, there may not be time to identify the problem and instruct the video content playout to re-assemble the media presentation. Instead, the disaster recovery rules may provide a backup media presentation that can be transmitted to the content distributor.

In another embodiment, instead of using the asset IDs identified from the schedule to retrieve the corresponding fingerprints from the fingerprint database, the content verification system can use the fingerprints generated from content in the media presentation to index into the fingerprint database and identify the asset ID. Then, the content verification system can determine if the asset IDs retrieved from the fingerprint database matches the asset IDs for the timestamps in the schedule shown in FIG. 3 to verify the media presentation. That is, the content verification system can either use the fingerprints generated from the media presentation, or the asset IDs retrieved from the schedule to index into the fingerprint database and retrieve data for verifying that the media presentation follows the schedule.

Figure 4:
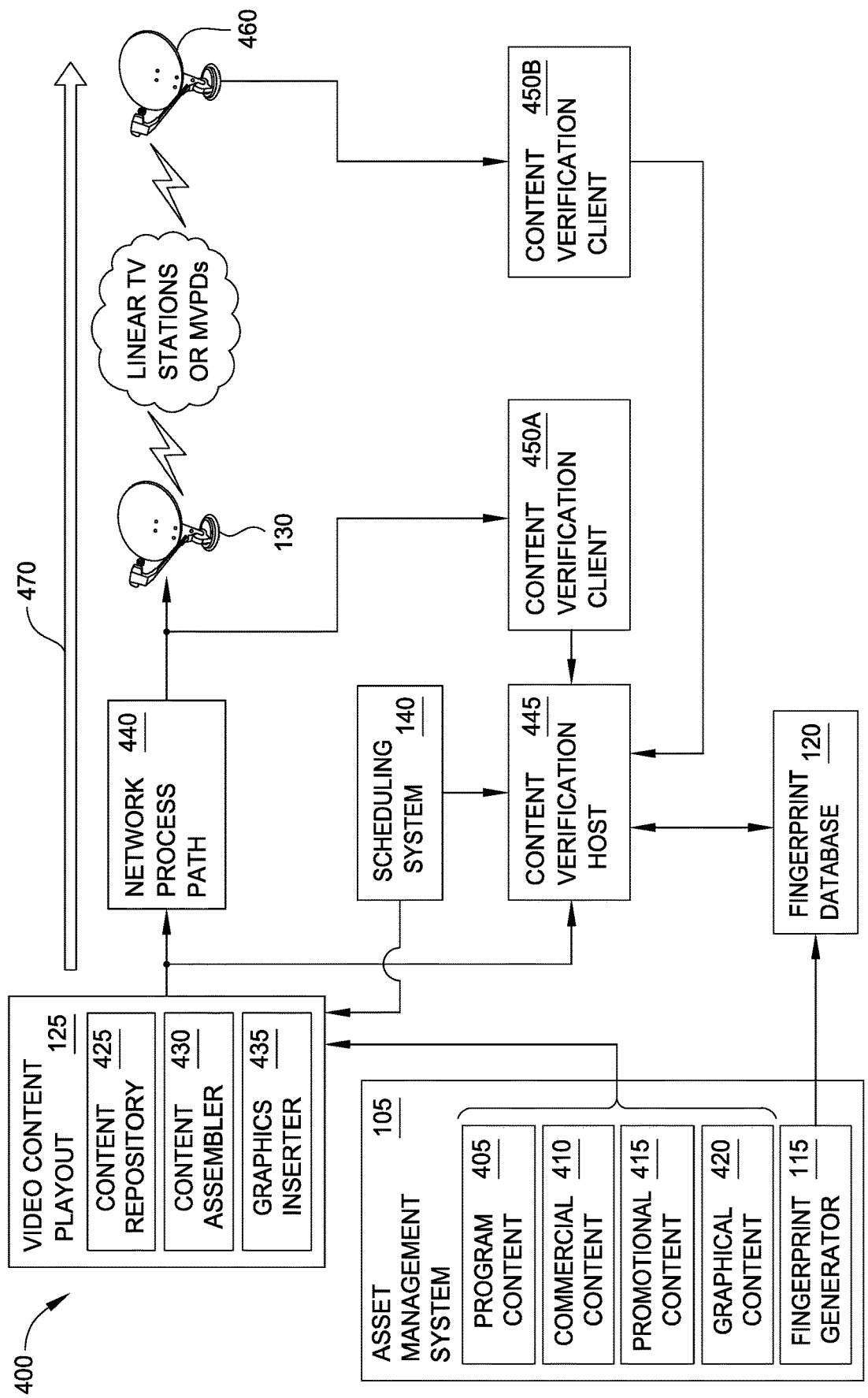
FIG. 4 is system for verifying content using a broadcast schedule, according to one embodiment described herein.

FIG. 4 is system 400 for verifying content using a broadcast schedule, according to one embodiment described herein. As shown in FIG. 4, the asset management system 105 includes program content 405, commercial content 410, promotional content 415, and graphical content 420. The program content 405 may include the program content (along with individual segments) for a plurality of shows. For example, the program content 405 may include the pre-recorded content for all the shows that are broadcasted on the telecommunication or cable network. As used herein, the commercial content 410 includes advertisements aired during commercial breaks that are paid for by third parties. The commercial content 410 may be displayed between segments of the show or at the end of shows or between shows. The promotional content 415 includes advertisements aired during commercial breaks that promote shows or events broadcasted by the network (i.e., the telecommunication, satellite, or cable company) or promote the network generally. For example, the promotional content 415 may be a sneak peak of the plot line for next week's show or a trailer for the show that follows the current show on the network's broadcast timeline. The graphical content 420 includes any graphics or text displayed that overlays the program content 405 (e.g., a snipe). Although the graphical content 420 can be a paid advertisement for a third party, this content 420 is generally used to promote the network or shows on the network like promotional content 415.

The video content playout 125 uses some or all of the content in the asset management system 105 to generate a media presentation. For example, the media presentation may correspond to a particular timeslot (e.g., a 30 minutes or 60 minute show) that includes program content 405, commercial content 410, promotional content 415, and graphical content 420. In system 400, it is assumed the media presentation is assembled by the video content playout 125 before the presentation is transmitted to the TV stations or MVPD. That is, the media presentation may correspond to prerecorded shows that are not aired live to user. As such, the video content playout 125 may transmit the media presentation to the TV stations or MVPDs hours or days before the media presentation is actually supposed to be broadcasted to the user (or made available via an on-demand system) according to the schedule system 140.

The video content playout 125 includes a content repository 425, content assembler 430, and graphics inserter 435. The content repository 425 may include all the content illustrated in asset management system 105. That is, after receiving the content and identifying the fingerprints, the asset management system 105 may forward the program content 405, commercial content 410, promotional content 415, and graphical content 420 to the content repository 425. In one embodiment, the content assembler 430 receives and processes instructions from the scheduling system 140 to assemble a media presentation. For example, if the schedule in the scheduling system 140 indicates that the first timestamp should be the first segment of a show, the content assembler 425 requests that segment from the program content 405 stored in the repository 425. The program content 405 may include the program content (along with individual segments) for a plurality of shows. For example, the program content 405 may include the pre-recorded content for all the shows that are broadcasted on the telecommunication or cable network. Using the schedule and the instructions provided by the scheduling system 140, the content assembler 430 can retrieve the corresponding show segments, commercials, and promotional advertisements from the repository 425.

The graphics inserter 435 inserts graphic overlays onto the show segments in the media presentation. In one embodiment, the graphic overlay is overlaid by a snipe that appears on a bottom third of viewable area of the media presentation. The snipe may include a graphic or animation to promote the network, a new show, the next show in the schedule, or advertise a product or service. In some embodiments, however, the graphics inserter 435 may be omitted from the video content playout 125.

The media presentation generated by the video content playout 125 is transmitted to the network process path 440 and to the content verification host 445. The network process path 440 may perform additional processing on the media presentation including the insertion of ancillary data, such as closed captioning, Nielsen ratings and/or additional processing such as audio loudness control. To ensure the media presentation was assembled correctly, system 400 includes a content verification host 445 which performs blocks 220-245 as illustrated in FIG. 2. That is, the content verification host 445 generates fingerprints for the assembled content in the media presentation and uses the schedule from the scheduling system 140 to identify the content that should be in the media presentation. The content verification host 445 retrieves the fingerprints for the content identified in the schedule and compares those fingerprints to the ones generated from the media presentation. If the fingerprints match, the media presentation is transmitted to via the communication system 130 to a distributor 460 (e.g., TV station or MVPD) using one or more transmission means (e.g., satellite, optical fiber, local access network, etc.).

The system 400 also includes content verification clients 450A and 450B. The clients 405A and 405B receive the media presentation at different stages along the communication path between the video content playout 125 and the distributors 460. Specifically, the content verification client 450A receives the media presentation after the network process path 440 but before the communication system 130. Content verification client 450B, however, receives the media presentation after the media presentation has been transmitted by the communication system 130 to the distributor 460.

Each content verification client 450 can be used to verify that the media presentation transmitted along a path 470 matches the schedule generated by the scheduling system 140. For example, at different stages of the path 470, the media presentation can be altered as data is reordered or altered for any number of reasons. By verifying the media presentation at different stages in the path 470, the system 400 can identify problems that are introduced at a particular stage or stages along the path 470. The system 400 may follow a different set of different disaster recovery rules if the media presentation does not match the schedule when checked by the content verification host 445 than if the media presentation does not match the schedule when verified by the content verification client 450B. Put differently, verifying the media presentation at different points along the path 470 permits the system 400 to identify a particular stage where an error was introduced into the media presentation and take appropriate action.

In one embodiment, the verification process performed by the content verification clients 450A and 450B is different from the verification process performed by the content verification host 445. To verify the media presentation, the content verification clients 450A and 450B may generate the fingerprints corresponding to the content in the media presentation and transmit those fingerprints to the content verification host 445. In this example, the content verification host 445 compares the fingerprints provided by the clients 450A and 450B to the fingerprints retrieved from the fingerprint database 120 using the schedule. If the fingerprints match, the content verification host 445 transmits a positive indicator to the client 450 which then permits the media presentation to proceed normally along the path 470. If not, the client 450 may perform a disaster recovery process to try to remedy the problem before the media presentation is provided to the user via the distributor 460. In this scenario, the content verification clients 450A and 450B do not need access to the fingerprint database 120, but rather provide the fingerprints to the host 445 which determines if the fingerprints match. In another embodiment, the content verification clients 450A and 450B may transmit the content of the media presentation to the content verification host 445 which then generate the fingerprints. However, one advantage of having the clients 450A and 450B determine the fingerprints for the content in the media presentation is that less bandwidth is needed for the communication channel between the clients 450A and 450B and the content verification host 445.

By distributing the content verification clients 450A and 450B, the system 400 can identify errors in the media presentation at different stages along the path 470 which enables the system 470 to take different corrective measures depending on where the error occurs. Although not shown, the system 400 may also include a content verification client that verifies the media presentation is correct after various stages performed within the video content playout 125. For example, after the content assembler 430 assembles the various program, commercial, and promotional content, the content verification client may determine if the media presentation correctly follows the schedule before the presentation is transmitted to the graphics inserter 435 which adds the graphical overlays to the presentation.

In one embodiment, an error may occur in the media presentation if a technician selects the wrong feed to send to the graphics inserter 435. Or, when inserting commercials, the content assembler 430 may receive the incorrect commercials for insertion. In another example, the media presentation may be stored in a data center before outputted by the video content playout 125. The data may become corrupted or may be mislabeled with a different media presentation when stored in the data center. In another example, because of time zones, a technician may inadvertently instruct the video content playout 125 to output a live show currently being aired in a different time zone rather than a tape delayed version of a show that was aired earlier. In any of these scenarios, the content verification host 445 can perform the verification technique described above to detect the error in the media presentation at different stages in the path 470.

Figure 5:
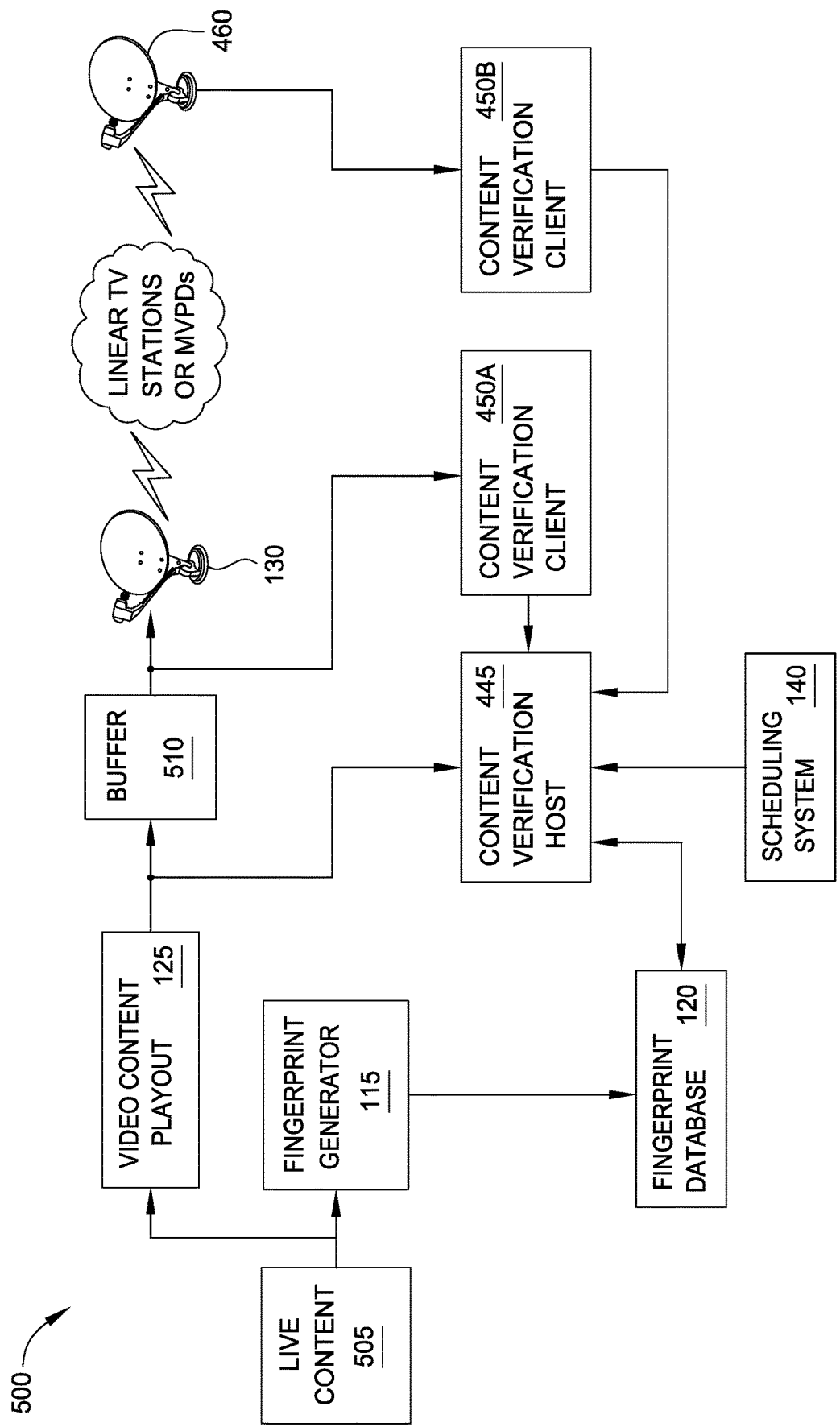
FIG. 5 is system for verifying content using a broadcast schedule, according to one embodiment described herein.

FIG. 5 is system 500 for verifying content using a broadcast schedule, according to one embodiment described herein. Here, the system 500 is arranged to generate a media presentation using live content 505 such as a live talk show, news program, sporting event, musical performance, and the like. As shown, the captured live content 505 is transmitted to both the video content playout 125 and the fingerprint generator 115. In this embodiment, the fingerprint generator 115 generates fingerprints for the live content 505 in parallel with the video content playout 125 assembling the live content 505 to generate a media presentation. As explained above, the fingerprints outputted by the fingerprint generator 115 are stored in the fingerprint database 120.

The video content playout 125 can add commercial content, promotional content, and graphical content as described above. For example, during a scheduled commercial break, the video content playout 125 may insert a plurality of commercials into the media presentation. In this example, the video content playout 125 may stream the media presentation in chunks (e.g., 5 seconds of content or 400 frames at a time) rather than outputting the media presentation as a whole.

To enable the system 500 to verify the content in the media presentation before transmitting the presentation to the distributor 460, the system 500 includes a buffer 510 which delays the media presentation outputted by the video content playout 125. For example, the buffer 510 may add a five to fifteen second delay. Although system 500 uses the delay to provide additional time to verify the media presentation, this delay may be useful for other purposes such as if there is a technical difficulty or an interruption in the live content 505.

As shown, the output of the video content playout 125 is transmitted to the content verification host 445 which can verify the content in the media presentation. That is, the host 445 can generate its own fingerprints for the content and determine if those fingerprints match fingerprints retrieved from the fingerprint database 120 which correspond to the content that should be airing according to the scheduling system 140. Moreover, like in FIG. 4, system 500 includes content verification clients 450A and 450B which verify the media presentation at other stages such as after the buffer 510 and after the media presentation is transmitted to the distributor 460. In another embodiment, the system 500 may verify the content in the media presentation during different stages of compilation in the video content playout such as when commercials are inserted or after snipes are overlaid the live content 505. In this manner, the system 500 can identify problems that arise at different stages in the broadcast transmission and take appropriate actions to remedy the problem.

Figure 6:
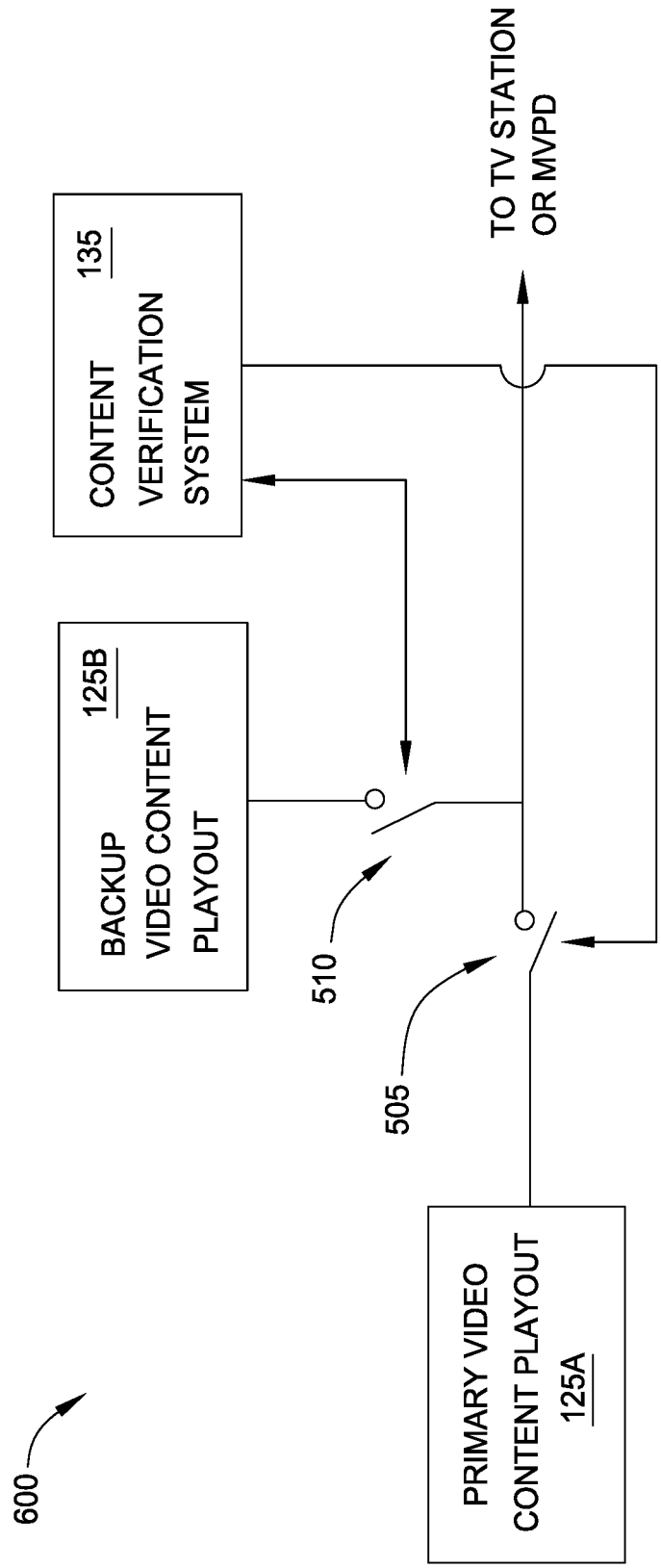
FIG. 6 is block diagram of a disaster recovery system, according to one embodiment described herein.

FIG. 6 is block diagram of a disaster recovery system, according to one embodiment described herein. FIG. 6 illustrates a system 600 which includes a primary video content playout 125A and a backup video content playout 125B. In one embodiment, the primary and video content playouts 125A and 125B are video production studios that are manned by redundant technicians and include the same automation software. For example, both video content playouts 125A and 125B may output the same media presentation but the content verification system 135 determines which output is transmitted to the TV stations or MVPD.

As shown, switch 505 is closed which indicates that the media presentation outputted by the primary video content playout 125A is transmitted to the TV stations or MVPD while switch 510 is open indicating the output of the backup video content playout is not being broadcasted. Having redundant video content playouts 125 may be preferred when broadcasting live events where there is not time to reproduce a media presentation if the content verification system 135 identifies an error. For example, when the media presentation is a show that was filmed and assembled a day in advance of its scheduled timeslot, the video content playout may have time to reassemble the media content if, for example, the content verification system 135 determines the ordering of the program segments is incorrect. However, with a live event, the system 500 may be used where at least one backup video content playout 125B generates an independent copy of the media presentation. Furthermore, even if the media presentation outputted by the video content playout 125 is correct, a later stage in the transmission path may insert an error into the media presentation. As such, although not shown, the system 500 may include other redundant systems (e.g., redundant communication systems or transmission paths) which can be switchable operated using the content verification system 135.

If an application or a technician operating the primary video content playout 125A inserts an error into the media presentation, the content verification system 135 can change the switches such that the media presentation generated by the backup video content playout 125B is transmitted to the TV stations or MVPD. That is, the content verification system 135 may open the switch 505 and close the switch 510 which graphically represents the system 600 outputting the media presentation generated by the backup video content playout 125B to the TV stations or MVPDs. In one embodiment, the decision to switch between the primary video content playout 125A and the backup video content playout 125B is performed automatically without any user input. Alternatively, the content verification system 135 may alert a technician when there is an issue who then decides whether to switch between the primary and backup video content playouts 125A and 125B.

In the preceding, reference is made to embodiments of the invention. However, it should be understood that the invention is not limited to specific described embodiments. Instead, any combination of the preceding features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
   receiving, from a video content playout, an assembled media presentation comprising a plurality of media assets, wherein the plurality of media assets contains different types of content that comprises an advertisement segment and a program segment;
   generating a respective first unique fingerprint for each of the plurality of media assets using at least one of audio data or video data in each of the plurality of media assets;
   identifying expected media assets expected in the assembled media presentation by matching at least one timestamp corresponding to the assembled media presentation to a timeslot in a schedule, wherein the schedule indicates a presentation order of the expected media assets for the assembled media presentation;

receiving a respective second unique fingerprint for each of the expected media assets, wherein the second unique fingerprints are generated before generating the first unique fingerprints;

comparing each of the first unique fingerprints to a respective one of the second unique fingerprints to verify whether the plurality of media assets in the assembled media presentation corresponds to the expected media assets, wherein verifying comprises determining whether each of the first unique fingerprints matches a corresponding one of the second unique fingerprints; and upon verifying the plurality of media assets in the assembled media presentation does not correspond to the expected media assets, performing a recovery rule to generate a corrected version of the assembled media presentation; and transmitting, after performing the recovery rule, the corrected version of the assembled media presentation to a content distributor tasked to deliver the corrected version of the assembled media presentation to multiple client devices, wherein the content distributor comprises at least one of a broadcast network, a video-on-demand provider, or an internet streaming service.

2. The method of claim 1, wherein generating the first unique fingerprints comprising evaluating a sub-portion of the total audio data or video data in each of the plurality of media assets.

3. The method of claim 1, wherein the first and second unique fingerprints are generated using a same algorithm.

4. The method of claim 1, wherein receiving the second unique fingerprints comprises:
retrieving the second unique fingerprints from a database using an asset ID corresponding to the expected media assets, wherein the asset ID is specified in the schedule.

5. The method of claim 1 wherein the assembled media presentation is scheduled to be broadcasted by the content distributor according to the timeslot in the schedule.

6. The method of claim 1, further comprising:
identifying at least one asset ID corresponding to the expected media assets using the schedule;
indexing into a database to identify the second unique fingerprints using the asset ID; and
determining if the first and second unique fingerprints match in order to verify the assembled media presentation.

7. The method of claim 1, wherein the program segment comprises at least a portion of a pre-recorded or live show and the advertisement comprises at least one paid advertisement, wherein the program segment corresponds to a first one of the first unique fingerprints and the advertisement corresponds to a second one of the first unique fingerprints.

8. A non-transitory computer readable storage medium comprising:
computer-readable program code, wherein, when executed by a computing processor, the computer-readable program code performs an operation comprising:
receiving, from a video content playout, an assembled media presentation comprising a plurality of media assets, wherein the plurality of media assets contains different types of content that comprises an advertisement segment and a program segment;
generating a respective first unique fingerprint for each of the plurality of media assets using at least one of audio data or video data in each of the plurality of media assets;

identifying expected media assets expected in the assembled media presentation by matching at least one timestamp corresponding to the assembled media presentation to a timeslot in a schedule, wherein the schedule indicates a presentation order of the expected media assets for the assembled media presentation;

receiving a respective second unique fingerprint for each of the expected media assets, wherein the second unique fingerprints are generated before generating the first unique fingerprints;

comparing each of the first unique fingerprints to a respective one of the second unique fingerprints in order to verify whether the plurality of media assets in the assembled media presentation corresponds to the expected media assets, wherein verifying comprises determining whether each of the first unique fingerprints matches a corresponding one of the second unique fingerprints; and upon verifying the plurality of media assets in the assembled media presentation does not correspond to the expected media assets, performing a recovery rule to generate a corrected version of the assembled media presentation; and transmitting, after performing the recovery rule, the corrected version of the assembled media presentation to a content distributor tasked to deliver the corrected version of the assembled media presentation to multiple client devices, wherein the content distributor comprises at least one of a broadcast network, a video-on-demand provider, or an internet streaming service.

9. The computer readable storage medium of claim 8, wherein generating the first unique fingerprints comprising evaluating a sub-portion of the total audio data or video data in each of the plurality of media assets.

10. The computer readable storage medium of claim 8, wherein the first and second unique fingerprints are generated using a same algorithm.

11. The computer readable storage medium of claim 8, wherein receiving the second unique fingerprints comprises:
retrieving the second unique fingerprints from a database using an asset ID corresponding to the expected media assets, wherein the asset ID is specified in the schedule.

12. The computer readable storage medium of claim 8, wherein the assembled media presentation is scheduled to be broadcasted by the content distributor according to the timeslot in the schedule.

13. The computer readable storage medium of claim 8, wherein the operation further comprises:
identifying at least one asset ID corresponding to the expected media assets using the schedule;
indexing into a database to identify the second unique fingerprints using the asset ID; and
determining if the first and second unique fingerprints match in order to verify the assembled media presentation.

14. The computer readable storage medium of claim 8, wherein the program segment comprises at least a part of a pre-recorded or live show and the advertisement comprises at least one paid advertisement, wherein the program segment corresponds to a first one of the first unique fingerprints and the advertisement corresponds to a second one of the first unique fingerprints.

15. A system, comprising:
one or more computing processors; and
a memory comprising a program that when executed by the one or more computer processor performs an operation, the operation comprising:

receiving, from a video content playout, an assembled media presentation comprising a plurality of media assets, wherein the plurality of media assets contains different types of content that comprises an advertisement segment and a program segment;

generating a respective first unique fingerprint for each of the plurality of media assets using at least one of audio data or video data in each of the plurality of media assets;

identifying expected media assets expected in the assembled media presentation by matching at least one timestamp corresponding to the assembled media presentation to a timeslot in a schedule, wherein the schedule indicates a presentation order of the expected media assets for the assembled media presentation;

receiving a respective second unique fingerprint for each of the expected media assets, wherein the second unique fingerprints are generated before generating the first unique fingerprints;

comparing each of the first unique fingerprints to a respective one of the second unique fingerprints to verify whether the plurality of media assets in the assembled media presentation corresponds to the expected media assets, wherein verifying comprises determining whether each of the first unique fingerprints matches a corresponding one of the second unique fingerprints; and upon verifying the plurality of media assets in the assembled media presentation does not correspond to the expected media assets, performing a recovery rule to generate a corrected version of the assembled media presentation; and transmitting, after performing the recovery rule, the corrected version of the assembled media presentation to a content distributor tasked to deliver the corrected version of the assembled media presentation to multiple client devices, wherein the content distributor comprises at least one of a broadcast network, a video-on-demand provider, or an internet streaming service.

16. The system of claim 15, wherein generating the first unique fingerprints comprising evaluating a sub-portion of the total audio data or video data in each of the plurality of media assets.

17. The system of claim 15, wherein the first and second unique fingerprints are generated using a same algorithm.

18. The system of claim 15, wherein the assembled media presentation is scheduled to be broadcasted by the content distributor according to the timeslot in the schedule.

19. The method of claim 1, further comprising:

after verifying the plurality of media assets in the assembled media presentation does not correspond to the expected media assets, selecting the recovery rule from a plurality of predefined recovery rules, wherein a first rule of the plurality of predefined recovery rules is selected after determining the assembled media presentation is part of a live broadcast and a second rule of the plurality of predefined recovery rules is selected after determining the assembled media presentation is scheduled to be broadcast at a later time.

20. The method of claim 1, wherein verifying whether the plurality of media assets in the assembled media presentation corresponds to the expected media assets comprises determining whether a chronological order of the first unique fingerprints matches a chronological order of the second unique fingerprints as defined in the schedule.

* * * * *